May 10, 1955

M. R. CREASY 2,707,920

CENTRIFUGAL PUMP

Filed April 9, 1954

INVENTOR.
MACAJAH R. CREASY
BY

McMorrow, Berman + Davidson
ATTORNEYS

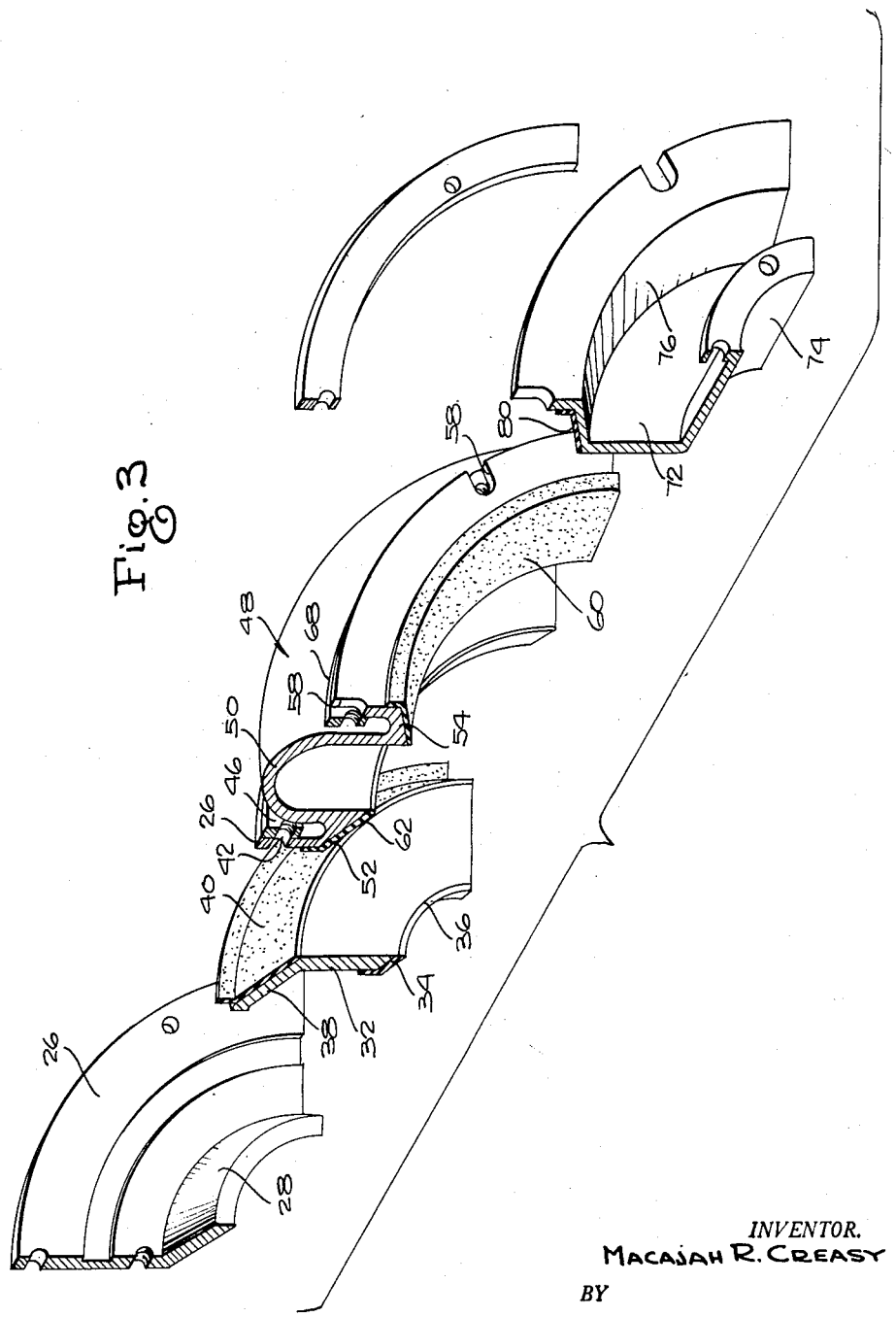

United States Patent Office 2,707,920
Patented May 10, 1955

2,707,920

CENTRIFUGAL PUMP

Macajah R. Creasy, Lakeland, Fla.

Application April 9, 1954, Serial No. 422,211

2 Claims. (Cl. 103—114)

This invention relates to a centrifugal pump and has for its primary object to simplify economies in the manufacture of pumps of this character.

Another object is to eliminate the necessity of the accurate machining of mating parts and at the same time produce a leak-proof structure.

The above and other objects may be attained by employing this invention which embodies among its features a stuffing box having a conical head projecting longitudinally from one end thereof, a hub liner mounted on the stuffing box in encircling relation to the conical head, a pump shell mounted on the hub liner, a suction head carried by the pump shell, the junctions of the conical head with the hub liner and the pump shell with the hub liner being sealed by annular gaskets of resilient flexible material, and the junction of the pump shell and stuffing box being sealed in a similar manner.

Other features include an annular flexible resilient frusto-conical sealing collar sealed to the extension on the stuffing box to effect a liquid-tight seal between the stuffing box and the hub liner and the hub liner and suction head both having annular facings of flexible resilient material sealed thereto and defining seals for engaging the pump shell and effecting fluid-tight junctions therewith.

In the drawings:

Figure 3 is an exploded perspective view of the various parts of the pump.

Figure 1:
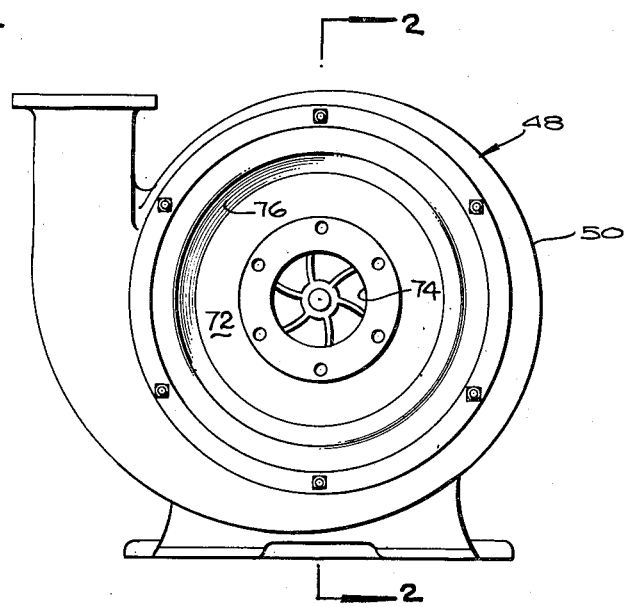
Figure 1 is a side view of a pump embodying the features of this invention.

Referring to the drawings in detail, this improved pump designated generally 10 comprises a pedestal 12 upon which is supported a stuffing box 14. The stuffing box is provided adjacent one end with a longitudinal conical extension 16 which defines the support for the pump mechanism, to be more fully hereinafter described. An annular outstanding flange 18 is carried by the stuffing box 14 and is provided at spaced intervals with openings 20, the axes of which lie parallel to the longitudinal axis of the stuffing box. While it is not absolutely essential, the outer conical surface 22 of the conical extension 16 may be machined or if the stuffing box is constructed of a casting having a substantially smooth surface, the surface 22 of the conical extension 16 may be left in the rough.

Bolted or otherwise secured as at 24 to the flange 18 is an annular hub head 26 carrying at its inner periphery an outwardly extending annular flange 28 which diminishes in diameter as it recedes from the hub head to define a frusto-conical seat having the same degree of taper as the surface 22 of the extension 16. Sealed to the frusto-conical flange 28 is an annular sealing ring 30 which, as illustrated in Figure 2, is adapted to engage the outer surface 22 of the conical extension 16 to effect a fluid-tight seal therewith when the bolts 24 are tightened to draw the hub head toward the flange 18.

Figure 2:
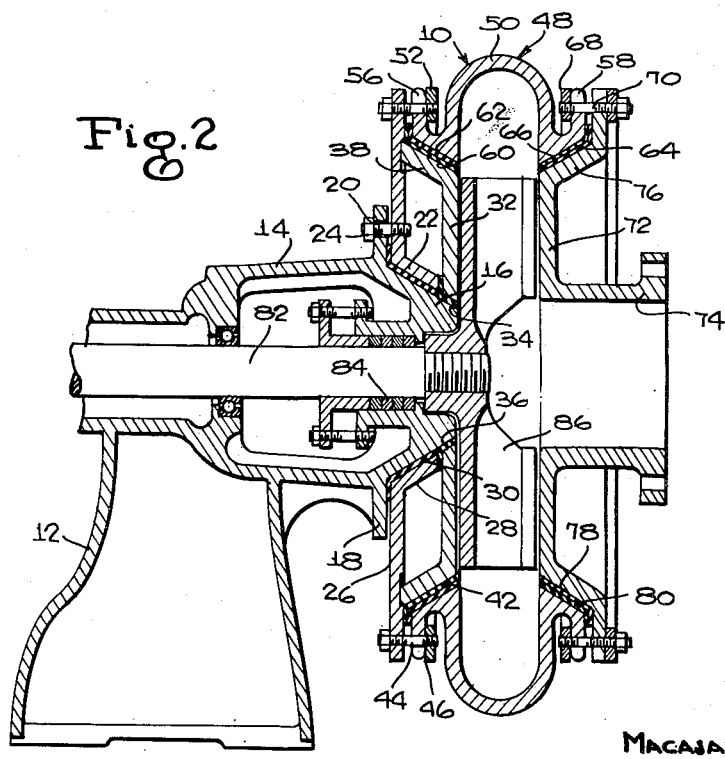
Figure 2 is a vertical sectional view taken substantially on the line 2—2 of Figure 1.

A hub liner 32 is provided with an axial opening 34 which inclines, as illustrated in Figure 2, to conform to the degree of inclination of the surface 22 of the extension 16 and sealed to the inner face of the opening 34 in the hub liner 32 is a sealing gasket 36 which, when the hub liner is in place, engages the surface 22 of the conical extension 26 between the outer end thereof and the flange 28 of the hub head 26. Carried by and extending obliquely outwardly from the hub liner 32 adjacent the periphery thereof is an annular flange 38 which defines a conical seat for the pump shell, to be more fully hereinafter described, and sealed to the outer periphery of the flange 38 is a band 40 of flexible resilient material, the purpose of which will hereinafter appear. Extending through the hub head 32 adjacent the periphery thereof are bolt receiving openings 42 for the reception of bolts 44 which are threadedly engaged with a clamping ring 46 by means of which the hub liner and hub head together with the pump shell, to be more fully hereinafter described, are held in assembled relation.

The pump shell, previously referred to, is designated by the reference numeral 48 and comprises an annular transversely arched body 50 of generally toric formation carrying adjacent opposite sides outwardly extending annular flanges 52 and 54, each provided with peripheral notches 56 and 58 with the notches 56 accommodating the bolts 44 so that the flange 52 may be engaged by the clamping ring 46 in order to hold the pump shell in place on the hub head 26. It is to be noted that the angle of inclination of the inner face of the flange 56 conforms to the angle of inclination of the flange 38 in order that as the bolts 44 are tightened, the adjacent surfaces of the flanges will be brought into close proximity. Sealed to the inner conical surface 60 of the flange 52 is a band 62 of flexible resilient material which, when the parts are assembled, is adapted to engage the band 40 and effect a liquid-tight seal between the hub liner 32 and the pump shell 48.

Sealed to the inner conical surface 64 of the flange 54 is a band 66 of flexible elastic sealing material and supported on the pump shell 48 by a clamping ring 68 and bolts 70 is a suction head 72 having an axial suction nozzle 74 which opens into the interior of the pump, as will be readily understood upon reference to the drawings. The suction head like the hub liner is provided adjacent its periphery with an outwardly extending annular flange 76 having a conical external surface 78 which carries and has sealed thereto an annular band 80 of resilient flexible material which is adapted to engage the band 66 to effect a fluid-tight seal between the pump shell 48 and the suction head 72.

A drive shaft 82 extends through a suitable packing 84 carried by the stuffing box and threadedly engaged with the shaft 82 for rotation therewith between the hub liner 32 and the suction head 72 is an impeller 86.

Obviously, in assembling a pump embodying the features of this invention, accurate machining between the various elements may be avoided by employing the sealing substances on the mating surfaces of the pump head, as above described, and inasmuch as the application of the coatings of flexible resilient material to the mating elements of the pump is a less expensive procedure than endeavoring to accurately machine the elements, it will be evident that not only is an effective seal produced, but material savings in labor may be achieved.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A centrifugal pump comprising a stuffing box, a conical extension carried by the stuffing box and extending axially therefrom, said extension diminishing in cross section as it recedes from the stuffing box to define a frusto-conical support, a hub head having an opening extending axially therethrough, an annular outstanding conical flange carried by the hub head in registration with the opening for receiving the conical extension, a hub liner carried by the conical extension between the end thereof remote from the stuffing box and the hub head, a frusto-conical annular flange carried by the hub liner and extending outwardly therefrom in concentric spaced relation to the conical extension, a pump shell, an annular flange carried by the pump shell and extending laterally outwardly therefrom to define an annular frusto-conical seat for receiving the flange on the hub liner, a second frusto-conical flange carried by the pump shell and extending outwardly therefrom opposite the first mentioned frusto-conical flange to define a second annular frusto-conical seat, a suction head having an axial inlet opening extending therethrough, an annular frusto-conical flange carried by the suction head in concentric spaced relation to the inlet opening for entrance into the second frusto-conical seat, a drive shaft extending through the stuffing box, and an impeller carried by the drive shaft for rotation therewith between the hub liner and the suction head.

2. A centrifugal pump comprising a stuffing box, a conical extension carried by the stuffing box and extending axially therefrom, said extension diminishing in cross section as it recedes from the stuffing box to define a frusto-conical support, a hub head having an opening extending axially therethrough, an annular outstanding conical flange carried by the hub head in registration with the opening for receiving the conical extension, a hub liner carried by the conical extension between the end thereof remote from the stuffing box and the hub head, a frusto-conical annular flange carried by the hub liner and extending outwardly therefrom in concentric spaced relation to the conical extension, a pump shell, an annular flange carried by the pump head and extending laterally outwardly therefrom to define an annular frusto-conical seat for receiving the flange on the hub liner, a second frusto-conical flange carried by the pump shell and extending outwardly therefrom opposite the first mentioned frusto-conical flange to define a second annular frusto-conical seat, a suction head having an axial inlet opening extending therethrough, an annular frusto-conical flange carried by the suction head in concentric spaced relation to the inlet opening for entrance into the second frusto-conical seat, a drive shaft extending through the stuffing box, an impeller carried by the drive shaft for rotation therewith between the hub liner and the suction head, an annular sealing ring of flexible resilient material sealed to the flange on the hub head, an annular sealing band of flexible resilient material sealed to the outer surface of the flange carried by the hub liner, a second annular sealing band of resilient flexible material sealed to the inner conical surface of the first mentioned flange on the pump shell, a third sealing band of flexible resilient material sealed to the inner surface of the second mentioned flange on the pump shell, and a fourth sealing band of flexible resilient material sealed to the outer surface of the flange on the suction head.

References Cited in the file of this patent

UNITED STATES PATENTS

| | | |
|---|---|---|
| 1,545,506 | Mackley | July 14, 1925 |
| 1,638,055 | Nagle | Aug. 9, 1927 |

FOREIGN PATENTS

| | | |
|---|---|---|
| 512,223 | Great Britain | Aug. 30, 1939 |